United States Patent
Shachaf et al.

(10) Patent No.: US 12,465,668 B2
(45) Date of Patent: Nov. 11, 2025

(54) ORGANIC SOLVENT FREE COMPOSITIONS COMPRISING PROTEIN-POLYMER CONJUGATES AND USES THEREOF

(71) Applicant: REGENTIS BIOMATERIALS LTD., Or-Akiva (IL)

(72) Inventors: Yonatan Shachaf, Haifa (IL); Raz Simon, Kibbutz Alonim (IL); Koby Gvili, Nesher (IL)

(73) Assignee: REGENTIS BIOMATERIALS LTD., Or-Akiva (IL)

( * ) Notice: Subject to any disclaimer, the term of this patent is extended or adjusted under 35 U.S.C. 154(b) by 462 days.

(21) Appl. No.: 17/554,720

(22) Filed: Dec. 17, 2021

(65) Prior Publication Data

US 2022/0105240 A1    Apr. 7, 2022

Related U.S. Application Data

(63) Continuation of application No. 16/062,497, filed as application No. PCT/IL2016/051333 on Dec. 14, 2016, now abandoned.

(30) Foreign Application Priority Data

Dec. 17, 2015  (WO) ............... PCT/IL2015/051228

(51) Int. Cl.
  *A61L 27/26*   (2006.01)
  *A61K 47/58*   (2017.01)
  *A61K 47/60*   (2017.01)
  *A61L 27/18*   (2006.01)
  *A61L 27/22*   (2006.01)
  *A61L 27/36*   (2006.01)
  *A61L 27/46*   (2006.01)
  *A61L 27/52*   (2006.01)

(52) U.S. Cl.
  CPC ............ *A61L 27/26* (2013.01); *A61K 47/58* (2017.08); *A61K 47/60* (2017.08); *A61L 27/18* (2013.01); *A61L 27/22* (2013.01); *A61L 27/225* (2013.01); *A61L 27/3687* (2013.01); *A61L 27/46* (2013.01); *A61L 27/52* (2013.01); *A61L 2430/40* (2013.01)

(58) Field of Classification Search
CPC .......... A61L 27/26; A61L 27/18; A61L 27/22; A61L 27/225; A61L 27/3687; A61L 27/52; A61L 2430/40; A61K 47/58; A61K 47/60; A61P 7/04
See application file for complete search history.

(56) References Cited

U.S. PATENT DOCUMENTS 8,007,774 B2    8/2011  Seliktar
2006/0233854 A1*  10/2006  Seliktar .............. A61L 27/225
                                         514/8.4
2008/0253987 A1*  10/2008  Rehor ................. A61L 24/046
                                         424/78.37
2010/0080791 A1   4/2010  Rousseau et al.
2014/0221590 A1   8/2014  Woody
2014/0273153 A1   9/2014  Kazantsev

FOREIGN PATENT DOCUMENTS

| CN | 100427102 | 10/2008 |
| CN | 102164619 | 8/2011 |
| JP | 8-53548 | 2/1996 |
| JP | 2005-517638 A | 6/2005 |
| JP | 2007-507480 | 3/2007 |
| JP | 2007-538381 A | 12/2007 |
| JP | 2015-515462 | 5/2015 |
| JP | 2015-210356 A | 11/2015 |
| WO | 2005061018 | 7/2005 |
| WO | 2008126092 | 10/2008 |
| WO | 2010064251 | 6/2010 |
| WO | 2011073991 | 6/2011 |
| WO | 2014035721 | 3/2014 |
| WO | 2014207749 | 12/2014 |

OTHER PUBLICATIONS

Further, Ahern (1995) (retreived from http://www.the-scientist.library.upenn.edu/vr1995/julv/tools 950724.html) (Year: 2006).*
Ahern (1995) (retrieved from http://www.thescientist.library.upenn.edu/yr1995/july/tools950724.html) (Year: 1995).*
Aimetti et al., (2009) Poly (ethylene glycol) hydrogels formed by thiol-ene photopolymerization for enzyme-responsive protein delivery. Biomaterials, 30(30), 6048-6054.
Buchta et al., (2005) Biochemical characterization of autologous fibrin sealants produced by CryoSeal® and Vivostal® in comparison to the homologous fibrin sealant product Tissucol/Tisseel®. Biomaterials, 26(31), 6233-6241.
Dikovsky et al., (2006) The effect of structural alterations of PEG-fibrinogen hydrogel scaffolds on 3-D cellular morphology and cellular migration. Biomaterials, 27(8), 1496-1506.
Goldshmid et al., (2015) Steric interference of adhesion supports in-vitro chondrogenesis of mesenchymal stem cells on hydrogels for cartilage repair. Scientific reports, 5, 12607.
Lutolf & Hubbell, (2005) Synthetic biomaterials as instructive extracellular microenvironments for morphogenesis in tissue engineering. Nature biotechnology, 23(1), 47-55.
Lutolf et al., (2003) Synthetic matrix metalloproteinase-sensitive hydrogels for the conduction of tissue regeneration: engineering cell-invasion characteristics. Proceedings of the National Academy of Sciences, 100(9), 5413-5418.

(Continued)

Primary Examiner — Alma Pipic
(74) Attorney, Agent, or Firm — Allan A. Fanucci, Esq.

(57) ABSTRACT

The present invention provides protein-polymer conjugates, and methods for generating biocompatible scaffolds formed of hydrogels comprising the conjugates and use of the scaffolds for tissue regeneration. The present invention provides improved processes for the preparation of the conjugates, wherein the conjugates of the invention are preferably produced in an environmentally friendly process avoiding polar organic solvents.

19 Claims, 6 Drawing Sheets

(56) References Cited

OTHER PUBLICATIONS

Mann et al., (2001) Smooth muscle cell growth in photopolymerized hydrogels with cell adhesive and proteolytically degradable domains: synthetic ECM analogs for tissue engineering. Biomaterials, 22(22), 3045-3051.
Peppas et al., (2000) Physicochemical foundations and structural design of hydrogels in medicine and biology. Annual review of biomedical engineering, 2(1), 9-29.
Pontes et al., (2009) GC determination of acetone, acetaldehyde, ethanol, and methanol in biological matrices and cell culture. Journal of chromatographic science, 47(4), 272-278.
Pratt et al., (2004) Synthetic extracellular matrices for in situ tissue engineering. Biotechnology and bioengineering, 86(1), 27-36.
Rufaihah et al., (2013) Enhanced infarct stabilization and neovascularization mediated by VEGF-loaded PEGylated fibrinogen hydrogel in a rodent myocardial infarction model. Biomaterials, 34(33), 8195-8202.
Seliktar, (2005) Extracellular stimulation in tissue engineering. Annals of the New York Academy of Sciences, 1047(1), 386-394.
Shapira-Schweitzer & Seliktar, (2007) Matrix stiffness affects spontaneous contraction of cardiomyocytes cultured within a PEGylated fibrinogen biomaterial. Acta biomaterialia, 3(1), 33-41.
Skiles et al., (2011) Tracking hypoxic signaling within encapsulated cell aggregates. Journal of visualized experiments: JoVE, 58, 1-5.
Stile et al., (2004) Poly (N-isopropylacrylamide)-based semi-interpenetrating polymer networks for tissue engineering applications. Effects of linear poly (acrylic acid) chains on rheology. Journal of Biomaterials Science, Polymer Edition, 15(7), 865-878.
Thompson et al., (2013) Characteristics of precipitation-formed polyethylene glycol microgels are controlled by molecular weight of reactants. Journal of visualized experiments: JoVE,82, 1-9.
Tsang & Bhatia, (2004) Three-dimensional tissue fabrication. Advanced drug delivery reviews, 56(11), 1635-1647.
International Search Report, dated Mar. 23, 2017, issuing in counterpart application No. PCT/IL2016/051333.
Dixit et al., "Hepatocyte Immobilization on PHEMA Microcarriers and its Biologically Modified Forms", Cell Transplant, 1992, vol. 1. No. 6, pp. 391-399.
Nakayama et al., "Photocurable Surgical Tissue Adhesive Glues Composed of Photoreactive Gelatin and Poly (ethylene glycol) Diacrylate", J Biomed Mater Res, 1999, vol. 48 No. 4, pp. 511-521.
Halstenberg S; Biologically engineered protein-graft-poly(ethylene glycol) hydrogels: a cell-adhesive and plasmin-degradable biosynthetic material for tissue repair. California Institute of Technology, Pasadena, California, 2002 (URL: https://thesis.library.caltech.edu/6366/1/Halstenberg_s_2002.pdf). 178 pages.

* cited by examiner

ORGANIC SOLVENT FREE COMPOSITIONS COMPRISING PROTEIN-POLYMER CONJUGATES AND USES THEREOF

FIELD OF THE INVENTION

The present invention relates to protein-polymer conjugates, to methods for generating biocompatible scaffolds formed of hydrogels comprising the conjugates and use of the scaffolds for tissue regeneration. The present invention discloses improved processes for the preparation of the conjugates, wherein the improved conjugates of the invention are produced using an environmentally friendly process avoiding organic solvents.

BACKGROUND OF THE INVENTION

Synthetic hybrid materials comprising protein-polymer conjugates can be used for tissue regeneration and drug delivery systems. Such hybrid biomaterials incorporate biological macromolecules with structurally versatile synthetic polymers to create a cross-linked hydrogel network (Lutolf, M. P. and J. A. Hubbell, Nat Biotechnol, 2005. 23(1): p. 47-55). These hybrid biomaterials can be used to create a biomimetic cellular environment by balancing the structural and biofunctional elements. Control over structural properties, including porosity, compliance, bulk density, mechanical properties, and degradability are directed through the synthetic polymer network, while the biological cell signaling is controlled through the incorporation of biological macromolecules, which may include protein fragments, growth factors, or biologically active peptide sequences (Peppas, N. A., et al., Annu Rev Biomed Eng, 2000. 2: p. 9-29; Tsang, V. L. and S. N. Bhatia, Adv Drug Deliv Rev, 2004. 56(11): p. 1635-47; Stile, R. A., et al., J Biomater Sci Polym Ed, 2004. 15(7): p. 865-78).

In this regard, both the biochemical and biomechanical features of the wound dressing may be used to initiate important cellular remodeling events, including cell migration, proliferation, and guided differentiation.

Such materials can readily be customized with microarchitecture, matrix stiffness, and proteolytic resistance specifically designed for guiding the remodeling and morphogenesis towards specific tissue engineering end-points (Pratt, A. B., et al., Biotechnol Bioeng, 2004. 86(1): p. 27-36).

Several biosynthetic hybrid materials have been disclosed for tissue engineering, including a poly(ethylene glycol) (PEG) hydrogel backbone, modified with the Arg-Gly-Asp (RGD) adhesion oligopeptide, and cross-linked with short oligopeptides containing a plasmin or collagenase degradation substrate described by Hubbell and co-workers (Lutolf, M. P., et al., Proc Natl Acad Sci USA, 2003. 100(9): p. 5413-8). Published application US 20140273153 discloses a method of covalently modifying proteins and other biological macromolecules using thiol-ene and thiol-yne chemistries. West and co-workers disclosed a proteolytically sensitive PEG-peptide biomaterial (Mann, B. K., et al., Biomaterials, 2001. 22(22): p. 3045-51).

Seliktar et al. developed an approach whereby hybrid biomaterials are formed utilizing a natural biological molecule and synthetic polymers as the building blocks of the matrix (protein-polymer adducts). The protein serves as the structural backbone of the polymeric network, thereby rendering the hydrogel naturally biodegradable via the inherent degradation sites on the protein sequence. Most of the structural properties of the protein-polymer hydrogel network are controlled through the synthetic polymer constituent. These materials have been rigorously validated in pre-clinical and clinical settings (Dikovsky, D., H. Bianco-Peled, and D. Seliktar, Biomaterials, 2006. 27(8): p. 1496-506; Shapira-Schweitzer, K. and D. Seliktar, Acta Biomater, 2007. 3(1): p. 33-41; Seliktar, D., Ann N Y Acad Sci, 2005. 1047: p. 386-94). One of the unique properties of this biomaterial is that it can quasi-independently alter its biochemistry and physical properties. Furthermore, synthetic materials can be beneficial for wound dressings and drug delivery systems, by utilizing the intrinsic properties of protein molecules, which are naturally biodegradable, and can be designed to control the rate of their resorption.

WO 2005/061018, WO 2008/126092 and WO 2011/073991 to some of the inventors of the present invention disclosed a process of preparing fibrinogen-PEG conjugates that includes the use of an organic solvent such as acetone to isolate the conjugates. In particular the previously known isolation step of these conjugates utilized environmentally unsafe polar organic solvents.

It would be advantageous to have synthetic biomaterial-conjugates containing minimal or no detectable traces of polar organic solvents and a process for producing protein-polymer hybrid material without use of these environmentally unsafe solvents.

SUMMARY OF THE INVENTION

The present invention provides improved hydrogel scaffolds comprising conjugates of extracellular matrix proteins with synthetic polymers. These scaffolds are useful as implants per se or as coating for implants. The conjugates and hydrogels formed with the conjugates of the invention have enhanced biocompatibility, increased safety and decreased likelihood of eliciting adverse reactions. In particular, the conjugates are generated using an improved process that avoids the use of potentially harmful polar organic solvents. This improvement is both environmentally more friendly and yields a product that is less likely to elicit adverse reactions in vivo.

The improved scaffolds of the invention utilize defined molar ratios of protein to polymer that provide controlled rates of disintegration in vivo within the subject. The rate of biodegradation of the hydrogels can be pre-determined a) by the proteins and polymers used in the conjugates; b) by the degree of cross-linking; and c) by the molar ratio of the protein to polymer.

According to one aspect, the present invention provides a composition comprising a protein-polymer conjugate comprising an extracellular matrix protein covalently bound to a synthetic polymer, wherein the synthetic polymer contains at least one polymerizable group, and wherein the composition is substantially free of polar organic solvents. According to some embodiments the compositions comprise less than 200 ppm, less than 100 ppm, less than 50 ppm, less than 20 ppm or less than 10 ppm of polar organic solvents. According to additional embodiments the compositions contain no detectable residue of polar organic solvents. Each possibility is a separate embodiment of the invention.

It is now disclosed for the first time that mixtures of plasma proteins may be advantageously used in the compositions and processes of the invention. Without wishing to be bound by any theory or mechanism of action, it is possible that the mixtures of proteins are advantageous in terms of biocompatibility and promotion of wound healing. According to some embodiments the conjugates of the invention are formed by reaction between unpurified or partially purified mixtures of plasma proteins with the polymers. According to alternative embodiments the fibrinogen may be purified fibrinogen. According to some specific embodiments the purified fibrinogen may be of a mammalian source, including but not limited to bovine fibrinogen.

According to some embodiments the protein is selected from the group consisting of fibrinogen, fibrin, albumin, fibronectin, collagen, denatured fibrinogen, denatured albumin, gelatin and any combination thereof. According to some embodiments the protein is of bovine, porcine or human origin. According to some embodiments the protein is partially purified. According to other embodiments the protein is highly purified.

According to some embodiments the polymer is selected from the group consisting of polyethylene glycol (PEG), hydroxyapatite/polycaprolactone (HA/PLC), polyglycolic acid (PGA), poly-L-lactic acid (PLLA), polymethyl-methacrylate (PMMA), polyhydroxyalkanoate (PHA), poly-4-hydroxybutyrate (P4HB), polypropylene fumarate (PPF), polyethylene glycol-dimethacrylate (PEG-DMA), polyethylene glycol-diacrylate (PEG-DA), beta-tricalcium phosphate (beta-TCP) and nonbiodegradable polytetrafluoroethylene (PTFE).

According to some specific embodiments the protein is fibrinogen and the polymer is polyethyleneglycol diacrylate (PEG-DA).

According to some embodiments, the composition of the present invention is characterized by a molar ratio of synthetic polymer to protein of between 40:1 to 400:1. In another embodiment, the composition of the present invention is characterized by a molar ratio of synthetic polymer to protein of between 100:1 to 250:1. In yet another embodiment, the composition of the present invention is characterized by a molar ratio of synthetic polymer to protein of between 100:1 to 150:1.

In an additional aspect, the present invention provides a hydrogel composition comprising cross-linked protein-polymer conjugate molecules, comprising an extracellular matrix protein covalently bound to a synthetic polymer, wherein said synthetic polymer contains at least one polymerizable group, and wherein said composition is substantially free of polar organic solvents.

According to some embodiments, the present invention further provides a hydrogel composition comprising cross-linked conjugate molecules, wherein the conjugate molecules are covalently cross-linked to one another upon polymerization of said polymerizable group and wherein said composition is substantially free of polar organic solvents.

According to a specific embodiment, the hydrogel composition of the present invention is substantially free of acetone. According to other embodiments, the hydrogel composition of the present invention is having shear storage modulus in the range of 0.05 kPa to 35 kPa.

According to yet another aspect the present invention further provides an improved process for the preparation of protein polymer conjugates which avoids the use of polar organic solvents.

According to an exemplary embodiment the process avoids the use of acetone and the resulting protein-polymer materials contain no traces of acetone. The improved process is both more eco-friendly and is more readily scaled up to provide increased industrial applicability.

According to some embodiments the process of producing protein polymer conjugate composition comprising the steps of: (a) dissolving at least one denatured extracellular matrix protein under basic conditions providing strong protein denaturation and reducing conditions; (b) providing a solution comprising a synthetic polymer having a polymerizable group; (c) mixing the extracellular matrix protein solution of (a) with the solution comprising synthetic polymer of (b) under basic pH providing strong protein denaturation and reducing conditions to create covalent conjugates between sulfhydryls of the protein and the polymerizable groups; and (d) concentrating the crude reaction mixture of step (c) without the concentrating process utilizing polar organic solvents.

In some embodiments, concentrating the crude reaction mixture according to step (d) is performed by centrifugation. In some particular embodiments the concentrating step is performed without removal of the unreacted polymers. Without being bound by any theory or mechanism of action, it is postulated that the lack of removal of the unreacted polymers may be advantageous. The excess unreacted polymers (not conjugated to the matrix protein) can provide additional polymerizable groups thereby improving the degree of cross-linking of the conjugates to form a hydrogel. More significantly, concentrating the conjugates without precipitating avoids the use of precipitation by means of a polar organic solvent.

According to another aspect, the present invention provides a stable ready for use liquid formulation in a non-cross linked form comprising a protein-polymer conjugate composition as described above and at least one polymerization initiator agent. In other words, according to some embodiments the product may be a ready to use stable precursor solution also referred to as a pre-gelated liquid form, that may be activated to yield the desired hydrogel in situ. The activation is achieved using said polymerization initiator agent, typically by exposure to light.

In some embodiments, the at least one polymerization initiator agent is selected from the group consisting of bis(2,4,6-trimethylbenzoyl) phenylphosphine oxide (BAPO), 2,2-dimethoxy-2-phenylacetophenone (DMPA), camphorquinone (CQ), 1-phenyl-1,2-propanedione (PPD), Cp'Pt(CH$_3$)$_3$ (Cp=eta5-C$_5$H$_4$CH$_3$), 2-hydroxy-1-[4-(hydroxyethoxy)phenyl]-2-methyl-1-propanone (e.g., IRGACURE™ 2959), dimethylaminoethyl methacrylate (DMAEMA), 2,2-dimethoxy-2-phenylacetophenone, benzophenone (BP), flavin containing compounds, and a combination of triethanolamine, N-vinylpyrrolidone and eosin Y. Each possibility is a separate embodiment of the invention.

In some embodiments, said ready for use formulation avoids the use of polar organic solvents. Advantageously, this ready for use formulation requires only activation of the photo-initiator by exposure to light prior to or during use.

According to some embodiments the ready to use formulation is held in a container selected from a single aliquot vial or a prefilled syringe. According to some embodiments, the ready for use liquid formulation is stored under visible light protected conditions in a pre-gelated form prior to initiation of polymerization. According to some embodiments, the ready for use formulation forms a hydrogel upon exposure to visible light. According to some embodiments, the ready for use liquid formulation is stored under UV protected conditions in a pre-gelated form prior to initiation of polymerization. According to some embodiments, the ready for use formulation forms a hydrogel upon exposure to UV light.

According to some embodiments, the ready for use formulation comprises less than 100 ppm of ethanol. In some currently preferred embodiments, the ready for use formulation contains no detectable residue of ethanol. According to some other embodiments, the ready for use formulation comprises less than 10 ppm of acetone. In some currently preferred embodiments, the ready for use formulation contains no detectable residue of acetone.

These and additional advantages of the present disclosure will become apparent in conjunction with the detailed description.

DETAILED DESCRIPTION OF THE INVENTION

Figure 1:
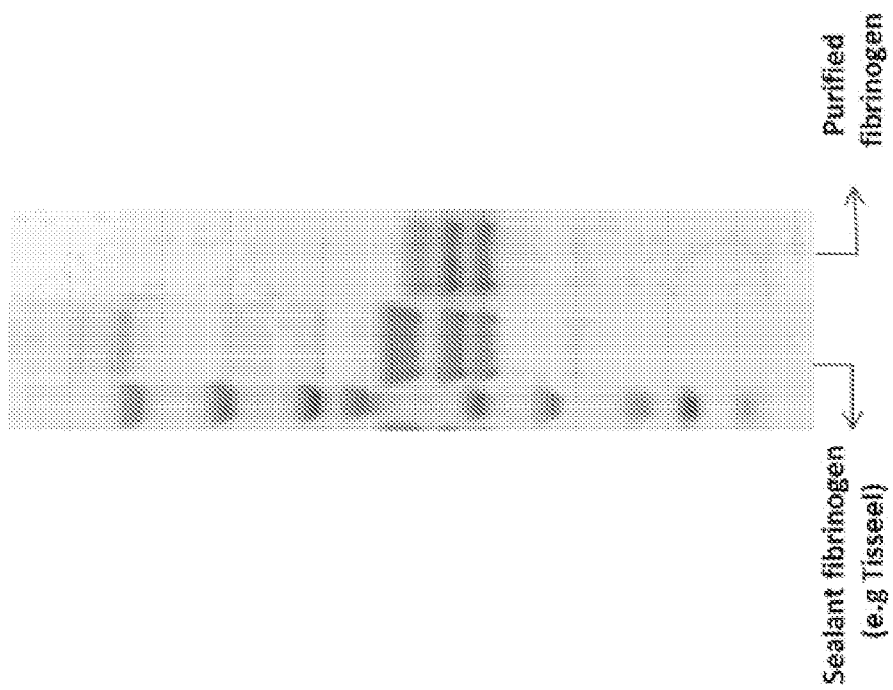
FIG. 1 presents the gel electrophoresis profile of human sealant comprising fibrinogen with additional plasma proteins in comparison to purified bovine fibrinogen.

The present invention provides improved hydrogel scaffolds comprising conjugates of extracellular matrix proteins with synthetic polymers. The conjugates of the invention are of increased biocompatibility as they do not contain polar organic solvents residues.

The corresponding hydrogels of the invention are a cross-linked form of the protein-synthetic polymer conjugates and are useful as biocompatible implants.

The present invention further provides an improved hydrogel scaffold composition, comprising a relatively low ratio of protein to synthetic polymer. The protein component of the present invention serves as a disintegrant, allowing the fine-tuning of the hydrogel resorption rate via controlling its biodegradability. The specific molar ratios of the protein and synthetic polymer are determined based on the desired rate of disintegration of the implant and the intended use.

Further control over the physical properties of the hydrogel scaffold can be achieved by regulating the cross-linking density within the hydrogel network. The protein component of the present invention may contain multiple cross-linking sites, which can be physically or chemically activated within the hydrogel implant.

According to one aspect, the present invention provides a composition comprising a protein-polymer conjugate comprising an extracellular matrix protein covalently bound to a synthetic polymer, wherein said synthetic polymer contains at least one polymerizable group, and wherein said composition is substantially free of polar organic solvents.

According to some embodiments, the protein is selected from the group consisting of fibrinogen, fibrin, albumin, fibronectin, collagen, denatured fibrinogen, denatured albumin, gelatin and any combination thereof. Each possibility is a separate embodiment of the invention. According to some embodiments, the protein is of bovine, porcine or human sources. According to some embodiments the polymer is selected from the group consisting of polyethylene glycol (PEG), hydroxyapatite/polycaprolactone (HA/PLC), polyglycolic acid (PGA), poly-L-lactic acid (PLLA), polymethyl methacrylate (PMMA), polyhydroxyalkanoate (PHA), poly-4-hydroxybutyrate (P4HB), polypropylene fumarate (PPF), polyethylene glycol-dimethacrylate (PEG-DMA), polyethylene glycol-diacrylate (PEG-DA), beta-tricalcium phosphate (beta-TCP) and nonbiodegradable polytetrafluoroethylene (PTFE). Each possibility is a separate embodiment of the invention. In one currently preferred embodiment the protein is fibrinogen and the polymer is polyethyleneglycol diacrylate (PEG-DA).

The present invention further relates to the advantageously low ratio of protein to synthetic polymer. In one embodiment, the composition of the present invention is characterized by a molar ratio of synthetic polymer to protein of between 40:1 to 400:1. In a more preferable embodiment, the composition of the present invention is characterized by a molar ratio of synthetic polymer to protein of between 100:1 to 250:1. In one currently preferred embodiment, the composition of the present invention is characterized by a molar ratio of synthetic polymer to protein of between 100:1 to 150:1.

According to one aspect, the present invention provides a composition comprising a protein-polymer conjugate comprising an extracellular matrix protein covalently bound to a synthetic polymer, wherein the synthetic polymer contains at least one polymerizable group, and wherein the composition is substantially free of polar organic solvents. According to some embodiments, the compositions comprise less than 200 ppm, less than 100 ppm, less than 50 ppm, less than 20 ppm or less than 10 ppm of polar organic solvents. According to some additional embodiments the compositions contain no detectable residue of polar organic solvents. Each possibility is a separate embodiment of the invention.

In an additional aspect, the present invention provides a hydrogel composition which is a cross-linked form of the protein-polymer conjugate molecules. In some embodiments, the hydrogel composition comprising cross-linked protein-polymer conjugate molecules, comprising an extracellular matrix protein covalently bound to a synthetic polymer, wherein said synthetic polymer contains at least one polymerizable group, and wherein said composition is substantially free of organic solvents. In one specific embodiment, the hydrogel composition of the present invention is substantially free of acetone. According to some embodiments, the hydrogel composition of the present invention is characterized by a shear storage modulus in the range of 0.05 kPa to 35 kPa. According to specific embodiments, the hydrogel composition of the present invention is characterized by a shear storage modulus in the range of 2 kPa to 15 kPa.

The present invention further relates to the gelation of the protein-polymer conjugates occurring upon the polymerization of the said polymerizable group.

The present invention further provides a new process, which enables efficient covalent attachment of the synthetic polymer to the protein and extraction of the final protein-polymer conjugates without the need for a step of acetone precipitation. The new acetone-free process of the present invention is an environmentally friendly process, giving rise to an acetone-free protein-polymer conjugate which upon gelation yields an acetone-free hydrogel with increased biocompatibility.

The process of the present invention demonstrates an advantageous up-scaling production potential compared to the process disclosed previously that utilizes polar organic solvent such as acetone. The prior art process used polar organic solvent to precipitate the conjugate and remove unreacted molecules from the reaction product. For example, the unreacted polymer or modified polymer that remains unbound to the protein can be removed by acetone precipitation.

Thus, in some embodiments, the process of the present invention does not require the extraction or precipitation of the protein-polymer conjugate from the reaction mixture prior to further processing. Consequently, the new acetone-free process of the present invention gives rise to a more efficient production process, yielding a safer hydrogel composition comprising protein-polymer conjugates for use in a patient.

According to some embodiments, the process of producing protein polymer conjugate composition comprising the steps of: (a) dissolving at least one unsaturated extracellular matrix protein under basic conditions providing strong protein denaturation and reducing conditions; (b) providing a solution comprising a synthetic polymer having a polymerizable group; (c) mixing the extracellular matrix protein solution of (a) with the solution comprising synthetic polymer of (b) under basic pH providing strong protein denaturation and reducing conditions to create covalent conjugates between sulfhydryls of the protein and the polymerizable groups; and (d) concentrating the crude reaction mixture of step (c) without the concentrating process utilizing polar organic solvents.

In some embodiments, concentrating the crude reaction mixture is carried without the removal of the unreacted polymers, specifically, without precipitation of the reaction mixture in a polar organic solvent. Thus, the improved process avoids the use of any organic solvent as a part of the synthetic procedure.

Without being bound by theory or mechanism of action, it is postulated that avoiding the removal of the unreacted polymer contributes to the polymerization and improves the cross-linking degree of the resulted hydrogel. The unreacted polymer comprising at least one polymerizable group, can be activated upon exposure of the reaction mixture to light and polymerize, thus increasing the cross-linking degree of the obtain hydrogel scaffold. In some embodiment the light source utilized is within the visible light range. In some other embodiments, the light source used is in the UV light range.

The present invention further relates to a stable single-vial pre-crossed linked formulation of the hydrogel composition of the invention. The single-vial formulation is a convenient ready for use formulation, comprising the protein-synthetic polymer conjugates and at least one photoinitiator agent stored under conditions preventing it from undergoing unwanted polymerization up to use. In some embodiments, the at least one polymerization initiator agent is selected from the group consisting of bis(2,4,6-trimethylbenzoyl) phenylphosphine oxide (BAPO), 2,2-dimethoxy-2-phenylacetophenone (DMPA), camphorquinone (CQ), 1-phenyl-1,2-propanedione (PPD), Cp'Pt(CH$_3$)$_3$ (Cp=eta5-C$_5$H$_4$CH$_3$), 2-hydroxy-1-[4-(hydroxyethoxy)phenyl]-2-methyl-1-propanone (e.g., IRGACURE™ 2959), dimethylaminoethyl methacrylate (DMAEMA), 2,2-dimethoxy-2-phenylacetophenone, benzophenone (BP), flavin containing compounds, and a combination of triethanolamine, N-vinylpyrrolidone and eosin Y. Each possibility is a separate embodiment of the invention. The single-vial formulation is giving rise to an equally stable hydrogel, demonstrating similar mechanical properties compared with a gel freshly prepared via mixing protein-synthetic polymer conjugates solution with at least one photoinitiator reagent. Without being bout by theory or mechanism of action, it is postulated that the ready for use formulation of the invention provides a more accurate composition of the ingredients due to the pre-mixing step of photoinitiator and conjugate molecules composition, thus promoting an improved user friendly procedure. In some embodiments, said ready for use single vial formulation avoids the use of polar organic solvents. In some embodiments, the ready for use formulation is held in a container selected from a single aliquot vial or a prefilled syringe.

In some embodiments the ready for use liquid formulation is stored under visible light protected conditions in a pre-gelated form prior to initiation of polymerization. In some embodiments the ready for use liquid formulation is stored under UV protected conditions in a pre-gelated form prior to initiation of polymerization. In some embodiments, the ready for use liquid formulation goes through a cross-linking process and forms the hydrogel of the invention upon activation by means of exposure to light. In some embodiments, the activation is achieved by exposure to visible light rage (e.g. 400 to 700 nm). In some other embodiments, the activation is achieved by exposure to UV light. In some embodiments the ready for use formulation comprises less than 100 ppm of ethanol. In some currently preferred embodiments, the ready for use formulation contains no detectable residue of ethanol. According to some other embodiments, the ready for use formulation comprises less than 10 ppm of acetone. In some currently preferred embodiments, the ready for use formulation contains no detectable residue of acetone.

Unexpectedly, as exemplified herein below, PEG-fibrinogen implants based on human fibrinogen sealant were found to be superior in some respects to PEG-fibrinogen implants based on purified fibrinogen. Whereas commercially available purified fibrinogen typically contains more than 95% fibrinogen, fibrinogen obtained in the form of the sealant product is typically of 70-80% purity. In addition to fibrinogen, the sealant products contain other plasma proteins including but not limited to albumin and fibronectin (Christoph Buchta et al. *Biomaterials*, 26, 31 (2005), 6233-6241). Unexpectedly, the additional proteins provide a more robust product that is highly biocompatible. FIG. 1 shows the protein profile of one such sealant and of a purified fibrinogen. One can see that the sealant sample contains protein species in addition to fibrinogen. Surprisingly, the PEG-fibrinogen implant derived from sealant outperformed PEG-fibrinogen implant based on pure fibrinogen in various measurements, indicating improved bioavailability.

The term "in vivo" according to the present invention refers to within a living organism such as a plant or an animal, preferably in mammals, preferably in a human subject. As used herein the term "subject" refers to a vertebrate, preferably a mammal, more preferably a human being (male or female) at any age.

As used herein, the phrase "ex vivo" refers to living cells which are derived from an organism and are growing (or cultured) outside of the living organism, preferably, outside the body of a vertebrate, a mammal, or human being. For example, cells which are derived from a human being such as human muscle cells or human aortic endothelial cells and are cultured outside of the body are referred to as cells which are cultured ex vivo.

As used herein, the terms "protein" and "polypeptide" are used interchangeably and encompass any naturally occurring polypeptide comprising at least 10 peptide residues, as well as biologically active fragments thereof (e.g., fragments inducing cell adhesion and/or cell signaling). Biologically active fragments may be generated by any method known in the art (e.g., cleavage by an enzyme and/or a chemical reagent).

Proteolysis-sensitive fragments may be generated by any method known in the art (e.g., cleavage by an enzyme and/or a chemical reagent). The thiolation of a protein is particularly suitable for producing the abovementioned composition-of-matter when the protein has a low cysteine content, as a non-protein with a low cysteine content typically has few thiol groups. Introduction of additional thiol groups by thiolating the protein creates additional sites available for linking synthetic polymers. Proteins having little or no cysteine (e.g., collagen) have heretofore not been suitable for inclusion in polymer-protein conjugate molecules comprising synthetic polymers attached to cysteine residues of the protein. As many proteins have a low cysteine content, thiolation of a protein overcomes a serious drawback for polymer-protein conjugate molecules. Optionally, the protein to be thiolated comprises less than 5 cysteine residues per 100 amino acid residues. Optionally, the protein comprises less than 3 cysteine residues per 100 amino acid residues, optionally less than 2 cysteine residues per 100 amino acid residues, and optionally less than 1 cysteine residue per 100 amino acid residues. Optionally, the protein of the present invention is denatured.

As used herein and in the claims the terms "thiol" or "sulfhydryl" are used interchangeably and refer to a —SH group.

Without being bound by any particular theory, it is believed that denatured proteins typically have more sites available for attaching to synthetic polymers. Proteins may be denatured by various methods well known in the art. For example, proteins can be denatured by heating or exposure to denaturing agents such as urea or guanidinium chloride. As exemplified hereinbelow, the protein may be denatured in a solution comprising 8 M urea.

The term "polymer" refers to a molecule composed primarily of a plurality of repeating units. The phrase "synthetic polymer" refers to any polymer which is made of a synthetic material, i.e., a non-natural, non-cellular material. It is to be understood that the names of the abovementioned polymers refer to the repeating units which make up the majority of the structure of the synthetic polymers, and are not meant to exclude the presence of additional functional groups in the synthetic polymer. Thus for example, a synthetic polymer consisting of polyethylene glycol with two acrylate groups (i.e., PEG-diacrylate) is encompassed herein by the terms "polyethylene glycol" and "PEG".

Methods of preparing functionalized PEG molecules are known in the arts. For example, PEG-vinyl sulfone can optionally be prepared under argon by reacting a dichloromethane (DCM) solution of the PEG-OH with NaH and then with divinylsulfone (optionally at molar ratios: OH 1:NaH 5:divinyl sulfone 50, and with 0.2 gram PEG per ml of DCM). PEG-Ac may optionally be made under argon by reacting a DCM solution of the PEG-OH with acryloyl chloride and triethylamine (optionally at molar ratios: OH 1:acryloyl chloride 1.5:triethylamine 2, and with 0.2 gram PEG per ml of DCM).

As used herein and in the claims the terms "cross-linking", "curing" or "polymerization" are used interchangeably and refer to the formation of inter-connected protein-polymer conjugate molecules by means of covalent interactions between the polymerizable groups of polymers of neighboring conjugates. Exemplary polymerizable functional groups capable of cross-linking include, without limitation, acrylate and vinyl sulfone. The cross-linking of the protein-polymer conjugate molecules of the present invention is initiated by a compound which initiates a chemical polymerization reaction.

Due to the ease of cross-linking of the conjugate molecules of embodiments of the present invention so as to form a scaffold, cross-linking of the conjugate molecules may be performed either inside (i.e., in vivo) or outside of a body. Cross-linking in vivo, for example, may be used to generate a scaffold having the exact shape of the cavity in the body that is to be filled with the scaffold.

Various methods of cross-linking are known in the art. For example, cross-linking may be effected by illumination (e.g., by ultraviolet light or by visible light), by chemical reagents (e.g., free radical donors) and/or heat.

According to an optional embodiment of the present invention, the cross-linking is by illumination with ultraviolet light (e.g., at a wavelength of about 365 nm). According to certain other embodiments the cross-linking illumination is in the visible light range.

As used herein the term "about" refers to +−10%.

Optionally, a photoinitiator is added to facilitate cross-linking. Addition of a photoinitiator will typically enable one to use lower doses of ultraviolet light for cross-linking.

As used herein and in the claims, the term "polar organic solvents" refers to organic solvents having a large dipole moments, i.e. solvents that contain bonds between atoms with distinct electronegativity, for example, oxygen bonded to hydrogen. Polar organic solvents include both protic solvents e.g. alcohols, ammonia, acetic acid, etc., and aprotic polar solvents e.g. acetone, dimethylformamid (DMF), acetonitrile, dimethyl sulfoxide (DMSO), etc.

As used herein, the term "substantially free of" polar organic solvents means that the amount of polar organic solvents is no more than a predetermined amount specified in ppm or even that it is undetectable by conventional detection means (e.g., gas chromatography). According to some exemplary embodiments the amount of polar organic solvents is reduced by at least 80%, preferably at least 90% and more preferably at least 98% in the protein-polymer conjugate composition and hydrogel composition of the present invention compared to the corresponding previously disclosed materials, which were produced utilizing polar organic solvent precipitation procedure. Additionally, the term "a process substantially free of" polar organic solvents as used herein refers to a process of producing a protein-polymer conjugate composition or a hydrogel composition, which does not comprise any synthetic step involving polar organic solvents.

As used herein and in the claims, the term "devoid of" polar organic solvents refer to a composition contains no detectable traces of polar organic solvents. As used herein, the term "photoinitiator" describes a compound which initiates a chemical reaction (e.g., cross-linking reaction, polymerization) when exposed to light, more specifically, ultraviolet illumination. Many suitable photoinitiators will be known to one skilled in the art. Exemplary photoinitiators include, without limitation, bis(2,4,6-trimethylbenzoyl) phenylphosphine oxide (BAPO), 2,2-dimethoxy-2-phenylacetophenone (DMPA), camphorquinone (CQ), 1-phenyl-1,2-propanedione (PPD), the organometallic complex Cp'Pt $(CH_3)_3$ (Cp=eta5-$C_5H_4CH_3$), 2-hydroxy-1-[4-(hydroxyethoxy)phenyl]-2-methyl-1-propanone (e.g., IRGACURE™ 2959), dimethylaminoethyl methacrylate (DMAEMA), 2,2-dimethoxy-2-phenylacetophenone, benzophenone (BP), and flavins. In some embodiments, a combination of triethanolamine, N-vinylpyrrolidone and eosin Y can be used as a photoinitiator under visible light conditions.

As used herein and in the claims the terms "non-cross linked" or "pre-cross linked" are used interchangeably and refer to a mixture of reagents in a liquid solution ready to polymerize upon activation, e.g. of a photoinitiator by exposure to light.

As used herein and in the claims the terms "hydrogel" or "scaffold" are used interchangeably and refer to a two-dimensional or a three-dimensional polymeric porous matrix comprising protein-polymer conjugate molecules which are covalently cross-linked to one another. A hydrogel according to the present invention can be tailored to possess a range of properties depending on the protein, polymer and their ratio in the hydrogel and on additional materials which may be added such as, mineral solutions or aggregates, polysaccharides, active ingredients, excipients and more. By controlling cross-linking, the scaffold of the present invention can form two- or three-dimensional structure at any size, structure or porosity. The scaffold of the present invention can be embedded within, or formed around, another scaffold or gel or it can be linked to additional materials to form a hybrid or coated scaffold. In some embodiments of the present invention, the scaffold of the present invention can be used to support cell growth, attachment, spreading, and thus facilitate cell growth, tissue regeneration and/or tissue repair. In alternative embodiments of the present invention, the scaffold can be used as an adhesive, and thus facilitate tissue repair. Optionally, the adhesive does not support cell growth. According to an optional embodiment of the present invention, the scaffold is biodegradable.

As used herein and in the claims the terms "single vial formulation", "single aliquot vial" or "ready for use" are used interchangeably and refer a composition comprising the polymer-protein conjugate molecules mixed with photoinitiator in a non-cross linked form, which can be activated upon exposure to light. In some embodiments, the ready for use formulation may comprise unreacted polymers, which can react in a cross-linking process together with the protein-polymer conjugate molecules upon exposure to light. In some embodiments, the activation of polymerization occurs upon exposure to UV light. In some other embodiments, the activation of polymerization occurs upon exposure to visible light range.

The term "biocompatible" as used herein refers to materials having affinity with living tissues, low toxicity and little or no unacceptable foreign body reactions in the living body. For example, the proteins, synthetic polymers, protein-synthetic polymer conjugates and the hydrogels of the present invention are biocompatible.

This term "implantation" refers to the insertion of the composition of the invention into a subject, whereby the hydrogel composition of the invention serves to replace, fully or partially, tissue that has been damaged or removed. Another aspect of implantation is also taken to mean the use of the composition as a vehicle to transport therapeutic agents to a certain site in a patient. In this aspect there is also included the incorporation into the composition or implant of a therapeutic agent selected from growth factors, cytokines, chemotherapeutic drugs, enzymes, anti-microbials, anti-inflammatory agents.

The scaffold of the present invention can be implanted in the subject using a surgical tool such as a scalpel, spoon, spatula, or other surgical device. It will be appreciated that in vivo formation of a tissue can be also achieved by administering the scaffold conjugate molecules to the subject and further cross-linking the conjugate molecules in vivo.

As used herein, the terms "biodegradable" and "biodegradability" refer to being capable of being degraded (i.e., broken down) by biological proteases or other biomolecules. Biodegradability depends on the availability of degradation substrates (i.e., biological materials or portion thereof), the presence of biodegrading materials (e.g., microorganisms, enzymes, proteins) and the availability of oxygen (for aerobic organisms, microorganisms or portions thereof), carbon dioxide (for anaerobic organisms, microorganisms or portions thereof) and/or other nutrients. In addition, biodegradability of a material, such as the scaffold of the present invention, also depends on the material structure and/or mechanical properties, i.e., the porosity, flexibility, viscosity, cross-link density, hydrophobicity/hydrophilicity, and elasticity which may affect passage and availability of gasses and nutrients.

The biodegradability of the scaffold derives at least in part from the biodegradability of the protein in the scaffold, which forms the backbone of the scaffold. The biodegradability of the scaffold can be determined by selecting a protein which provides a particular level of biodegradability. Furthermore, the biodegradability can be determined by selecting a biodegradable or non-biodegradable synthetic polymer. Biodegradability is also affected by the number of synthetic molecules attached to each protein, as large numbers of attached synthetic molecules may reduce biodegradability by masking cleavage sites.

The biodegradability of a hydrogel scaffold of embodiments of the present invention can be determined by subjecting such hydrogels to enzymatic degradation using proteases such as plasmin, trypsin, collagenase, chemotrypsin and the like.

Addition of synthetic polymer will increase the mechanical strength of the scaffold that is generated. If the synthetic polymer is non-biodegradable, the biodegradability of the scaffold will be reduced. Thus, the properties of the scaffold can be modified as desired by adding an appropriate amount of synthetic polymer to be cross-linked with the conjugate molecules.

It is to be noted that one may remove unconjugated synthetic polymer prior to cross-linking of the conjugate molecules, and then add the same unconjugated synthetic polymer to be cross-linked with the conjugate molecules. For example, it may be desirable to remove unconjugated synthetic polymer of which the concentration is uncertain, and then add unconjugated synthetic polymer at a known concentration.

In general, the biological and mechanical properties of the scaffold will be determined in part by the ratio of protein to synthetic polymer in the scaffold. For example, scaffolds with a high protein content will exhibit the biological properties, such as cell signaling, of the proteins contained therein, while retaining the advantageous mechanical properties characteristic of the synthetic polymer contained therein. Exemplary scaffolds comprise PEG and fibrinogen at a molar ratio ranging from 25:1 PEG per protein to 400:1 PEG per protein.

Apart from being inexpensive to produce, the scaffold of the present invention is highly reproducible, flexible (can be stressed or stretched easily), exhibits controllable structural properties, and is amenable to controllable biodegradation; characteristics which make it highly suitable for in vivo or ex vivo engineering of tissues such as bone, nerve, cartilage, heart muscle, skin tissue, blood vessels, and other tissues (soft and hard) in the body. For example, a scaffold and/or hydrogel according to embodiments of the present invention can be easily placed into gaps within a tissue or an organ, following which it can fill the void and initiate the process of regeneration as the scaffold degrades away.

In many cases, it is desirable to have live cells grow in the space filled by a scaffold used in tissue engineering. This is facilitated by having live cells seeded in the scaffold. One advantage of embodiments of the present invention is that the scaffold may be formed from a liquid phase (e.g., a solution of a polymer-protein conjugate), using mild conditions to initiate cross-linking. Consequently, live cells may be dispersed among the conjugate molecules, resulting in a scaffold having live cells embedded therein, as cross-linking can be performed with mild conditions that do not harm the cells.

Hence, according to an optional embodiment of the present invention, the scaffold comprises live cells embedded therein. Optionally, the scaffold with live cells embedded therein comprises thiolated protein.

Exemplary cells suitable for inclusion in embodiments of the present invention are capable of forming a tissue, including, without limitation, stem cells such as embryonic stem cells, bone marrow stem cells, cord blood cells, mesenchymal stem cells, adult tissue stem cells; or differentiated cells such as neural cells, retinal cells, epidermal cells, hepatocytes, pancreatic (islet) cells, osseous cells, cartilaginous cells, elastic cells, fibrous cells, myocytes, myocardial cells, endothelial cells, smooth muscle cells, and hematopoietic cells.

As used herein, the term "seeding" refers to encapsulating, entrapping, plating, placing and/or dropping cells into the scaffold of the present invention. It will be appreciated that the concentration of cells which are seeded on or within the scaffold of the present invention depends on the type of cells used and the composition of scaffold used (i.e., molar ratio between the synthetic polymer and protein within the conjugate molecules and the percent of cross-linking molecule used).

It will be appreciated that seeding of the cells can be performed following the formation of the scaffold or hydrogel formed from the scaffold, or by mixing the cells with the conjugate molecules prior to the cross-linking which generates the scaffold. The concentration of cells to be seeded on the scaffold and/or hydrogel depends on the cell type and the properties of the scaffold and/or hydrogel, and those of skills in the art are capable of determining a suitable concentration of cells in each case.

It will be appreciated that following seeding the cells on the scaffold and/or hydrogel, the cells are optionally cultured in the presence of tissue culture medium and growth factors, in order to maintain their viability.

The scaffold and/or hydrogel may be examined (e.g., using an inverted microscope) following seeding, in order to evaluate cell growth, spreading and tissue formation, as exemplified in the Examples section. As used herein and in the claims the term "shear storage modulus (G')" refers to a mechanical property of solid materials, which defines the relationship between shear stress (force per unit area) and shear strain (proportional deformation—elasticity) in a material. As used herein the term "shear loss modulus (G")" refers to the viscous properties of viscoelastic materials, which together with shear storage modulus defines the complex shear modulus, which is used to describe the mechanical properties of viscoelastic solid materials.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The following non-limiting examples are presented in order to more fully illustrate certain embodiments of the invention. They should in no way, however, be construed as limiting the broad scope of the invention. One skilled in the art can readily devise many variations and modifications of the principles disclosed herein without departing from the scope of the invention.

EXAMPLES

Example 1: Comparative Example: Determination of Acetone Residue in Fibrinogen-PEG DA Hydrogel Composition Obtained in Accordance With Previously Disclosed Procedures A chemical analysis was performed in order to determine the acetone content in the hydrogel composition prepared according to previously disclosed procedures (WO 2005/061018, WO 2008/126092 and WO 2011/073991).

A gas chromatography with flame ionization detection method (GC-FID, Hewlett Packard 5890) was utilized in order to determine the acetone content in the product. A Head Space (HS) sample injection and a capillary GC Column ZB-624 (Length 75 m, I.D. 0.53 mm, Film thickness 3.0 micron) was used with Helium and Hydrogen (Gas flow of 1 ml/min) as a carrier gas and flame gas, respectively. Liquid sample (5 ml) was added into a crimp-seal glass headspace vial (20 ml). The sample vial was put in the auto sampler and analyzed against a calibration curve using acetone as a standard at 5 varying concentrations. The HS injection procedure was comprised of 30 minutes incubation at 80° C. and syringe temperature of 100° C. (1 ml sample volume). For GC-method, a run time of 35 minutes was used. After 5 minutes at 40° C. (initial temperature), the temperature increased to 240° C. within 5 minutes. The injection port and the FID temperatures were set to 190° C. and 300° C., respectively. The measured acetone amounts in ppm in both Human and bovine source fibrinogen-PEG DA based hydrogels are summarized in table 1:

TABLE 1

| Batch number | Human sealant [ppm] | Bovine fibrinogen [ppm] |
|---|---|---|
| 1 | 293 | 63 |
| 2 | 292 | 639 |
| 3 | 120 | 276 |
| 4 | 54 | 481 |
| 5 | 25.5 | 133 |
| 6 | 30 | 90 |
| 7 | 27 | 123 |
| 8 | 14.1 | — |
| 9 | 29.4 | — |
| 10 | 29.4 | — |
| 11 | 151 | — |
| 12 | 100 | — |
| 13 | 182 | — |
| 14 | 94 | — |
| Average | 103 | 258 |

Example 2: Preparation of PEG-DA-Fibrinogen Conjugates of Bovine Source (Purified Fibrinogen)

A 7 mg/ml solution of bovine fibrinogen (Bovogen Biologicals Pty Ltd, Melbourne, Australia) in 10 mM phosphate-buffered saline (PBS) with 8M urea was prepared with tris (2-carboxyethyl) phosphine hydrochloride (TCEP-HCl) (Sigma). The TCEP-HCl was added at a molar ratio of 1-1.5:1 TCEP to fibrinogen cysteines. The solution pH was corrected to 8.0 with NaOH. PEG-DA was dissolved in 10 mM PBS and 8M urea (280 mg/mL) to achieve complete dissolution prior to the addition of PEG-DA to the dissolved fibrinogen solution. The molar ratio of PEG-DA to fibrinogen cysteines was 3:1 (linear PEG-DA, 10 kDa). The mixture was reacted in a reaction vessel with a thermostatic jacket at a temperature of 25±1° C. for 3 h protected from light. The solution was then diluted with an equal volume of PBS and was transferred from the reaction vessel into the sample reservoir of a tangential flow filtration system.

Tangential flow filtration technique was implemented using Omega type cassette (30 kDa MW cutoff, Pall Corporation) to purify and concentrate the modified protein against 10 mM of PBS down to a concentration of 8-12 mg/ml.

The solution was then further diluted with PEG-DA in PBS solution to achieve protein concentration of 6-8 mg/ml and a molar ratio of 1:120 (±20) PEG-DA and the protein. The solution was then passed through a high shear fluid processor (Microfluidics M110-Y, USA) to achieve a uniform particle size reduction.

Example 3: Preparation of PEG-DA-Fibrinogen Conjugates of Human Source (Unpurified Fibrinogen Sealant)

A 7 mg/ml solution of Human fibrinogen (TISSEEL—Protein Sealant, Baxter, USA) in 10 mM phosphate-buffered saline (PBS) with 8M urea was prepared with tris (2-carboxyethyl) phosphine hydrochloride (TCEP-HCl) (Sigma). The TCEP-HCl was added at a molar ratio of 1-1.5:1 TCEP to fibrinogen cysteines. The solution pH was corrected to 8.0 with NaOH. PEG-DA was dissolved in 10 mM PBS and 8M urea (280 mg/mL) to achieve complete dissolution prior to the addition of PEG-DA to the dissolved fibrinogen solution. The molar ratio of PEG-DA to fibrinogen cysteines was 3:1 (linear PEG-DA, 10 kDa). The mixture was reacted in a reaction vessel with a thermostatic jacket at a temperature of 25±1° C. for 3 h protected from light. The solution was then diluted with an equal volume of PBS and was transferred from the reaction vessel into the sample reservoir of a tangential flow filtration system.

Tangential flow filtration technique was implemented using Omega type cassette (30 kDa MW cutoff, Pall Corporation) to purify and concentrate the modified protein against 10 mM of PBS down to a concentration of 8-12 mg/ml.

The solution was then further diluted with PEG-DA in PBS solution to achieve protein concentration of 6-8 mg/ml and a molar ratio of 1:120 (±20) PEG-DA and the protein. The solution was then passed through a high shear fluid processor (Microfluidics M110-Y, USA) to achieve a uniform particle size reduction.

Example 4: Preparation of a Hydrogel Utilizing Two Vial Formulations

The PEG-DA-fibrinogen conjugate solution as prepared in examples 2 or 3 was than filtered through 0.2 μm filter for sterilization. The filtrated solution was filled into vials under aseptic conditions and stored at temperature below −15° C. up to use. Photoinitiator stock solution of 10% w/v Irgacure 2959 (BASF, Switzerland) in 70% ethanol and water for injection solution was prepared. The stock solution was filtered through 0.2 μm filter for sterilization. The filtrated photoinitiator solution was filled into a vial under aseptic conditions and stored at temperature below −15° C. up to use.

In order to photo-cure the PEG-DA-fibrinogen conjugate solution and create the corresponding cross-linked hydrogel, the photoinitiator stock solution was added to the PEG-DA-fibrinogen conjugate solution as prepared in examples 2 or 3 to achieve a final concentration of 0.1% w/v of Irgacure 2959 and mixed vigorously before exposing to UV light.

Example 5: Preparation of a Stable Single-Vial Ready for Use Pre-Gelation Formulation The PEG-DA-fibrinogen conjugates solution as prepared in examples 2 or 3 was further mixed with IRGACURE® 2959 (BASF, Switzerland), to achieve a final concentration of 0.1% (w/v) of IRGACURE® 2959, and stirred until complete dissolution. The PEG-DA-fibrinogen conjugates solution containing the photoinitiator reagent was filtered through 0.2 μm filter for sterilization. The filtrated solution was filled into vials under aseptic conditions and stored at temperature below −15° C. up to use.

Example 6: Mechanical Stability and Gelation Kinetics of a Hydrogel From a Single Vial Formulation Rheological study of hydrogel samples obtained from both two vial formulation and a single vial formulation was carried out using rheometer AR-G2; TA Instruments connected to ultraviolet light source operating at 365 nm (e.g OmniCure® S1000) at intensity of 5 mW/cm$^2$. The shear storage modulus G', of 0.2 ml samples was measured and recorded. The data was further processed using Excel and the maximal G' value (G' Max) as well as the time to reach G' Max were analyzed.

Additionally, the effect of freezing and thawing of the hydrogel composition in its pre-cross linked state on the gel's mechanical properties was tested by applying alternating temperature set points promoting freezing-thawing cycles. The two hydrogel formulations (two vials and single vial) were incubated at −20° C. followed by incubation at 2-9° C. (marked as 5° C.) as summarized in table 2. In the case of the two vials formulation, the freezing and thawing cycles were performed on the two vials separately, while the gelation time and mechanical propertied of the formed hydrogel were measured following the mixing of the PEG-DA-fibrinogen conjugates solution and the photoinitiator solution.

TABLE 2

| Cycle No. | Storage Temperature [° C.] | Duration [days] |
|---|---|---|
| 1 | −20 | 5 |
|   | 5 | 5 |
| 2 | −20 | 4 |
|   | 5 | 5 |
| 3 | −20 | 4 |
|   | 5 | 5 |
| 4 | −20 | 5 |
|   | 5 | 9 |

Figure 2:
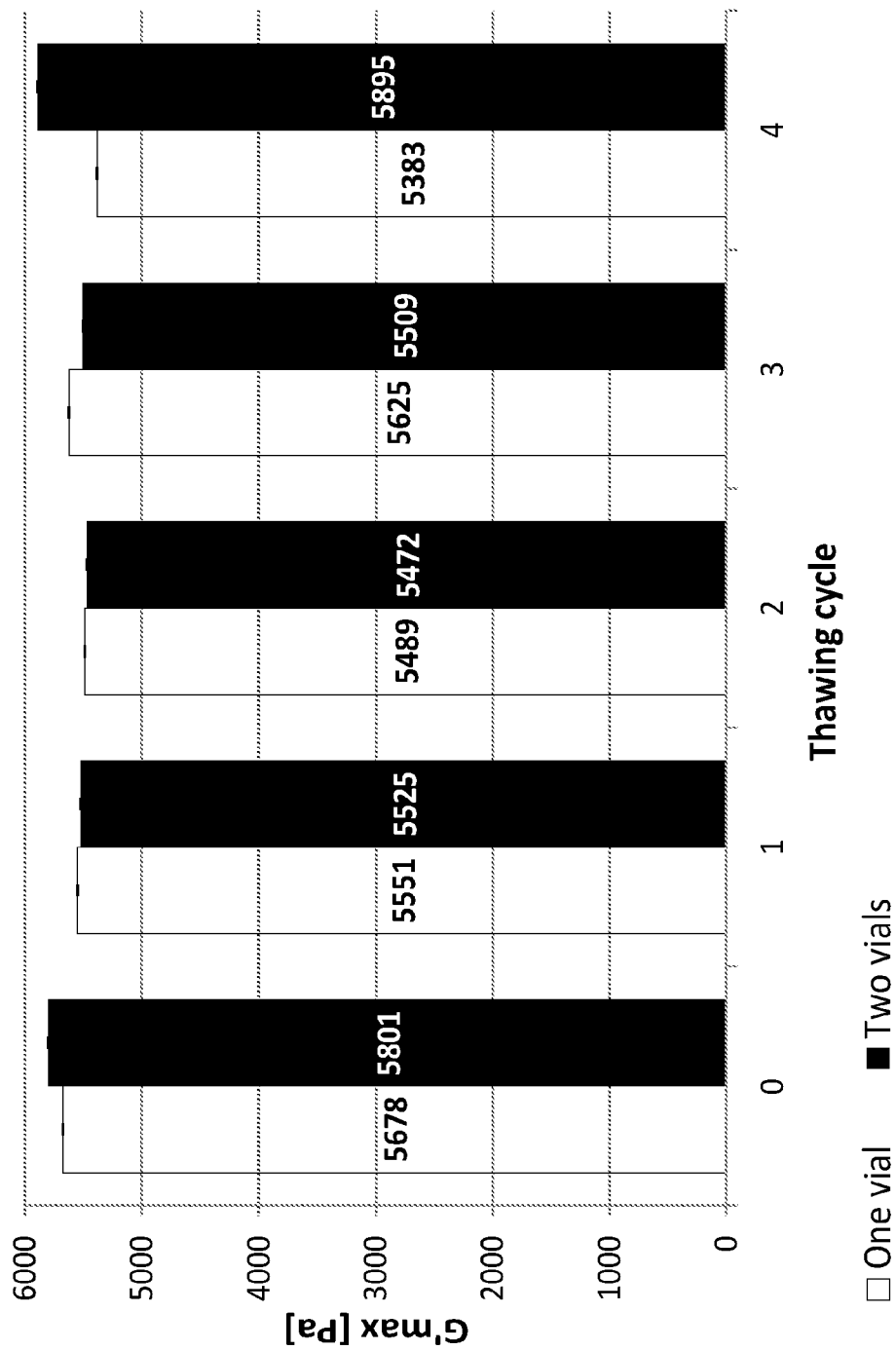
FIG. 2 presents the results of a hydrogel stability test comparing the gelated product originated from a novel stable single-vial formulation which contains photo-initiator reagent, PEG-fibrinogen conjugate molecules and an additional amount of PEG-DA in a pre-gelated form, to a hydrogel originated from a two vials formulation which contains the photoinitiator solution in one vial and PEG-fibrinogen conjugate molecules in a separate vial.

Results (1) The mechanical stability test of the gel resulted from two-vial formulation and single vial formulation demonstrated equally stable hydrogels. These results confirm that the presence of the photoinitiator in a single vial with the pre-gelated conjugate solution doesn't compromise the cross-linking properties of the material compared with the freshly mixed PEG-DA-fibrinogen solution and photoinitiator (FIG. 2). Furthermore, it appears that the freezing-thawing cycles have no detectable effect on the cross-linking properties of both gel formulations as demonstrated in FIG. 2.

Figure 3:
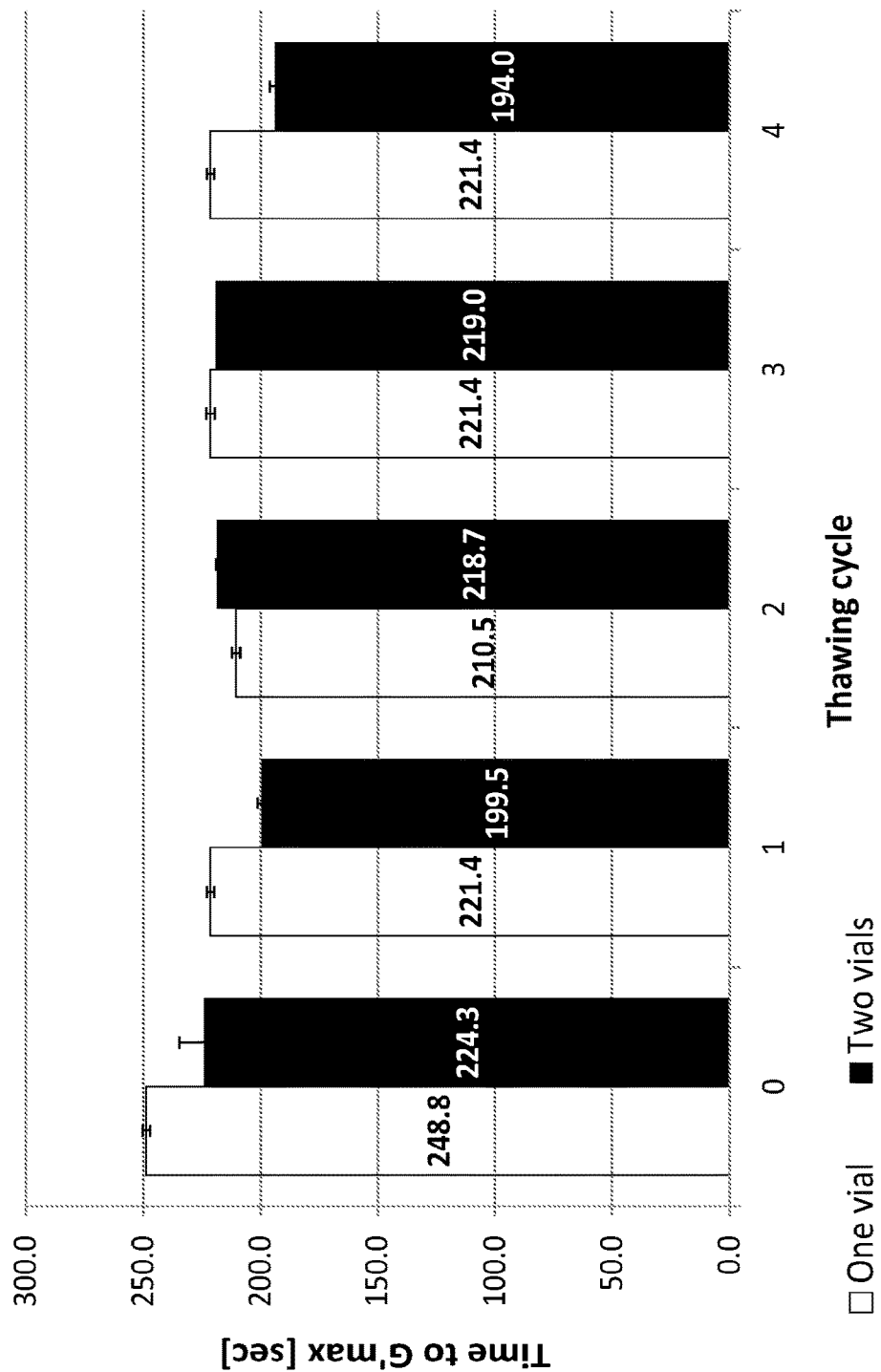
FIG. 3 presents the results of a gelation study comparing the gelation kinetics of a hydrogel originated from a novel stable single-vial formulation which contains photo-initiator reagent, PEG-fibrinogen conjugate molecules and an additional amount of PEG-DA in a pre-gelated form, to that of a hydrogel originated from a two vials formulation which contains the photoinitiator solution in one vial and PEG-fibrinogen conjugate molecules in a separate vial.

(2) The gelation kinetic study demonstrated similar gelation times for both tested hydrogels. The measured gelation time to reach G' Max appeared to be slightly affected by the freezing-thawing cycles and presented a minor reduction in gelation times after the first cycle (FIG. 3).

Example 7: Long Term Comparative Stability Study of Hydrogels Originating From Either Single Vial or Two Vial Formulations Long term stability of PEG-fibrinogen hydrogel solutions, stored as two vials or a single vial formulation, was assessed by comparing the maximal shear storage modulus (G' Max) obtained with freshly prepared solution (Time zero) and after at least one year storage at −20° C. (End point). The rheological measurement details are described hereinabove (Example 6).

TABLE 3

| Batch Configuration | Batch No. | G' Max (time Zero) | G' Max (End Point) | % Recovery |
|---|---|---|---|---|
| Two vials formulation, freshly mixed | 1 | 3589 | 3252 | 90.6 |
|  | 2 | 3550 | 3487 | 98.2 |
|  | 3 | 4627 | 4536 | 98.0 |
|  | 4 | 4623 | 4363 | 94.4 |

TABLE 3-continued

| Batch Configuration | Batch No. | G' Max (time Zero) | G' Max (End Point) | % Recovery |
|---|---|---|---|---|
|  |  |  | Average Recovery | 95.3 |
|  |  |  | STD | 3.6 |
| Single vial formulation | 1 | 4757 | 4728 | 99.4 |
|  | 2 | 5878 | 5552 | 94.5 |
|  | 3 | 4340 | 4336 | 99.9 |
|  | 4 | 3587 | 3368 | 93.9 |
|  | 5 | 5164 | 5034 | 97.5 |
|  | 6 | 4658 | 4640 | 99.6 |
|  |  |  | Average Recovery | 97.5 |
|  |  |  | STD | 2.7 |

Calculated value of '% recovery' refers to the relative G' Max value measured at the end point compared to the initial G' Max value measured at time zero (%).

The results demonstrate high % recovery values after prolonged storage for both two vial and single vial formulations. The recovery of the hydrogel originating from a single vial formulation is comparable with the one origination from the two vials formulation, validating the advantageous stability of the novel single vial formulation which enables the formation of a fully functional ready-to-use hydrogel with a prolonged shelf-life under proper storage (−20° C.).

Example 8: Preparation of a Stable Ready for Use Pre-Gelation Single-Vial Ethanol-Free Formulation 450 mg Irgacure 2959 (BASF, Switzerland) powder was added into 450 ml PEG-fibrinogen solution while stirring to obtain 0.1% (w/v) photo-initiator ready for use formulation. The stirring was continues until complete dissolution of the powder was observed. The solution was then passed through a high shear fluid processor (Microfluidics M110-Y, USA) to achieve a uniform particle size reduction, and through 0.2 µm filter (sterile filtration). The homogeneous and sterile mixture was then divided into 3 ml aliquots or syringes to obtain the ready for use formulation in a convenient, user friendly container.

Example 9: Long Term Stability Study of Ethanol-Free Ready to Use Formulation and the Mechanical Properties of Their Resulted Hydrogel Form Two samples prepared according to Example 8 were stored at −20° C. for a six month period. After six months the samples were thawed and exposed to UV for a duration of one minute utilizing UV light source (1=365 nm, I=5 mW/cm$^2$) (IlluminOss Medical Inc., East Providence, RI).

Both samples were successfully cross-linked upon UV exposure and their mechanical properties were measured.

Rheological characterization of GelrinC was performed using an AR-G2 parallel plate rheometer (TA instruments, New Castle, DE) equipped with 20-mm diameter parallel plate geometry. The time-sweep measurements were performed using an angular frequency of 3 rad/s and 2% strain.

TABLE 4

| Sample number | G' max [Pa] Time 0 | G' max [Pa] 6 months |
|---|---|---|
| 1 | 4919 | 5062 |
| 2 | 4515 | 4744 |

The results demonstrate full recovery of the stored pre-gelated formulation after a prolonged storage period. The formed hydrogels gained their original G' Max value and demonstrated the stability of the ethanol-free novel single vial formulation.

Example 10: Comparative Study of the Hydrogel Mechanical Properties and the Gel Formation Kinetics The hydrogels originated from both organic solvent free procedure, namely, 'improved process', and the process as disclosed in WO 2005/061018, WO 2008/126092 and WO 2011/073991, namely, 'previous process', were studied in term of rheological properties and gelation kinetics under similar conditions.

Rheological measurements were performed using an AR-G2 rheometer (TA Instruments, New Castle, DE) equipped with 20 mm flat steel geometry at UVA illumination intensity of 100 mw/cm$^2$ or 5 mw/cm$^2$ that was applied on 200 µl samples by photodynamic curing system (Illuminoss 75, Illuminoss Inc., Providence, RI). The illumination intensity was measured prior to cross-linking using the UV intensity meter.

Compression tests (Young's modulus): The Young's modulus (E) of the samples was measured using unconfined compression tests. Compression measurements were conducted using the squeeze/pull tests of an AR-G2 instrument equipped with a peltier plate for temperature control and 20 mm stainless steel geometry (TA instruments). The samples (0.17 ml in volume) were cross-linked in cylindrical Teflon molds (Ø=6 mm, h=6 mm) using 90 seconds illumination at 100 mW/cm$^2$. The illumination intensity was measured prior to cross-linking using the UV intensity meter.

a) curing process comparison: shear storage modulus vs. time

Figure 4:
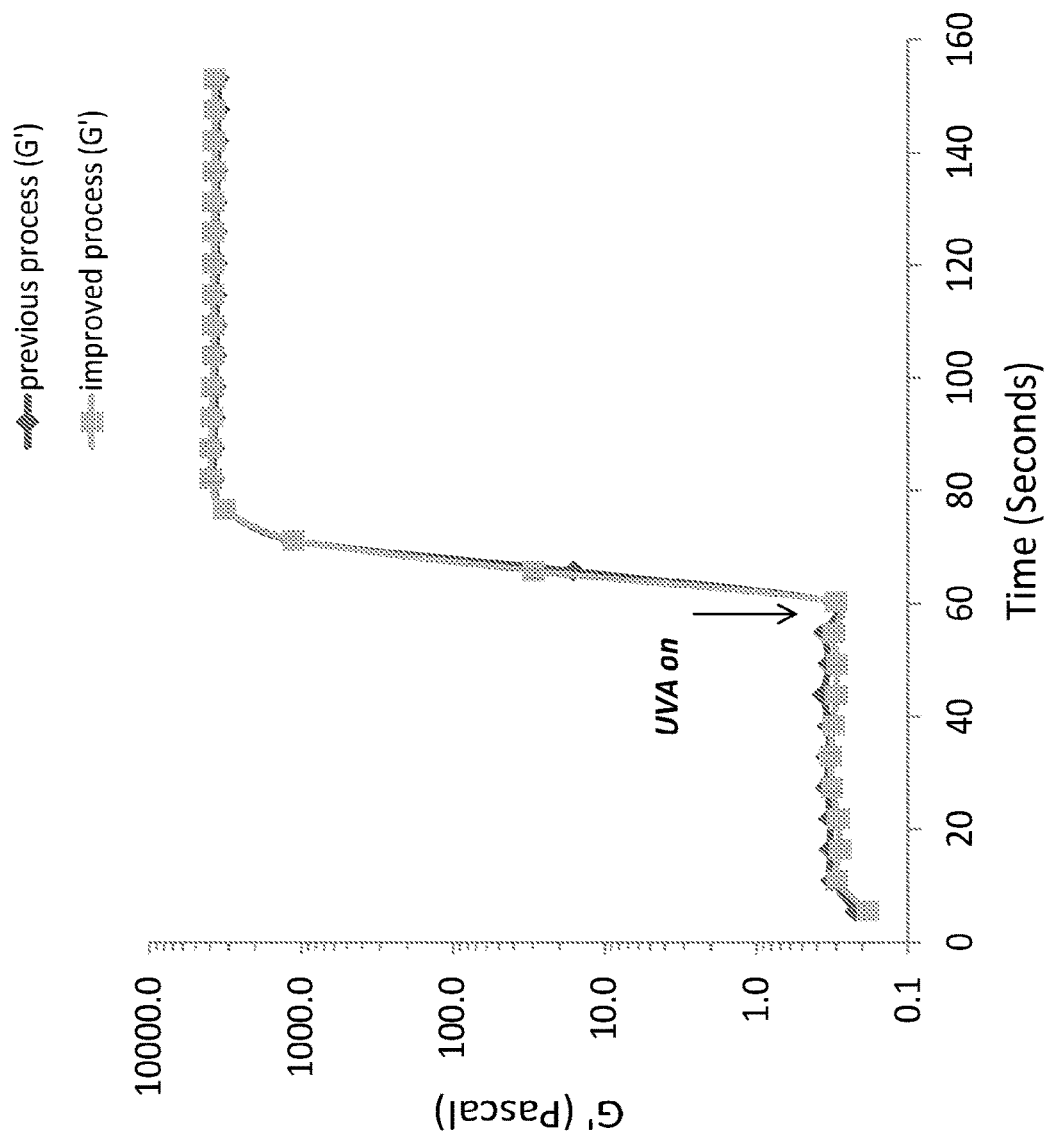
FIG. 4 depicts the curing kinetics of hydrogels originating from both organic solvent free procedure and the previously disclosed procedure involving acetone precipitation and ethanol addition.

Rheological measurements of shear storage modulus (G') as function of time demonstrated that the improved process which does not involve the use of organic solvents, and more specifically does not included acetone precipitation or ethanol addition for the gel preparation, yields a similar hydrogel precursors to the one including the use of organic solvents in terms of curing process kinetics. The photochemical reaction took place during 90 seconds of exposure to 100 mW/cm$^2$ UVA light, and was initiated 60 seconds after the beginning of the measurement (FIG. 4). The kinetic profile demonstrates a similar trend, which indicates that the improved organic solvent free gel is as mechanically robust as the previously disclosed gel but has both improved biocompatibility and a more efficient preparation process which does not involve the use of a large amount of environmentally unfriendly organic solvents.

b) The maximal shear storage modulus (G' max) and the time to reach G' max were measured for gels originating from both improved process (organic solvent free) and previously disclosed process. Analysis of the curing kinetics data shows that the time needed in order to reach G' max in the case of the improved procedure is similar to the time required in the previously disclosed procedure (Table 5). Additionally, the obtained G' max value is also is statistically indifferent for both materials (Table 6), suggesting that the improved process yields the desired gel in terms of mechanical properties and kinetics without the need to utilize organic solvents, which allows an improved preparation process and biocompatible gel composition.

TABLE 5

| | Time to G' max [sec] | |
|---|---|---|
| test # | Previous process | Improved process |
| 1 | 21.985 | 27.625 |
| 2 | 27.547 | 22.250 |
| 3 | 22.188 | 22.922 |
| Average | 23.9 | 24.3 |
| STDEV | 3.2 | 2.9 |
| ttest | 0.89 | |

TABLE 6

Figure 5:
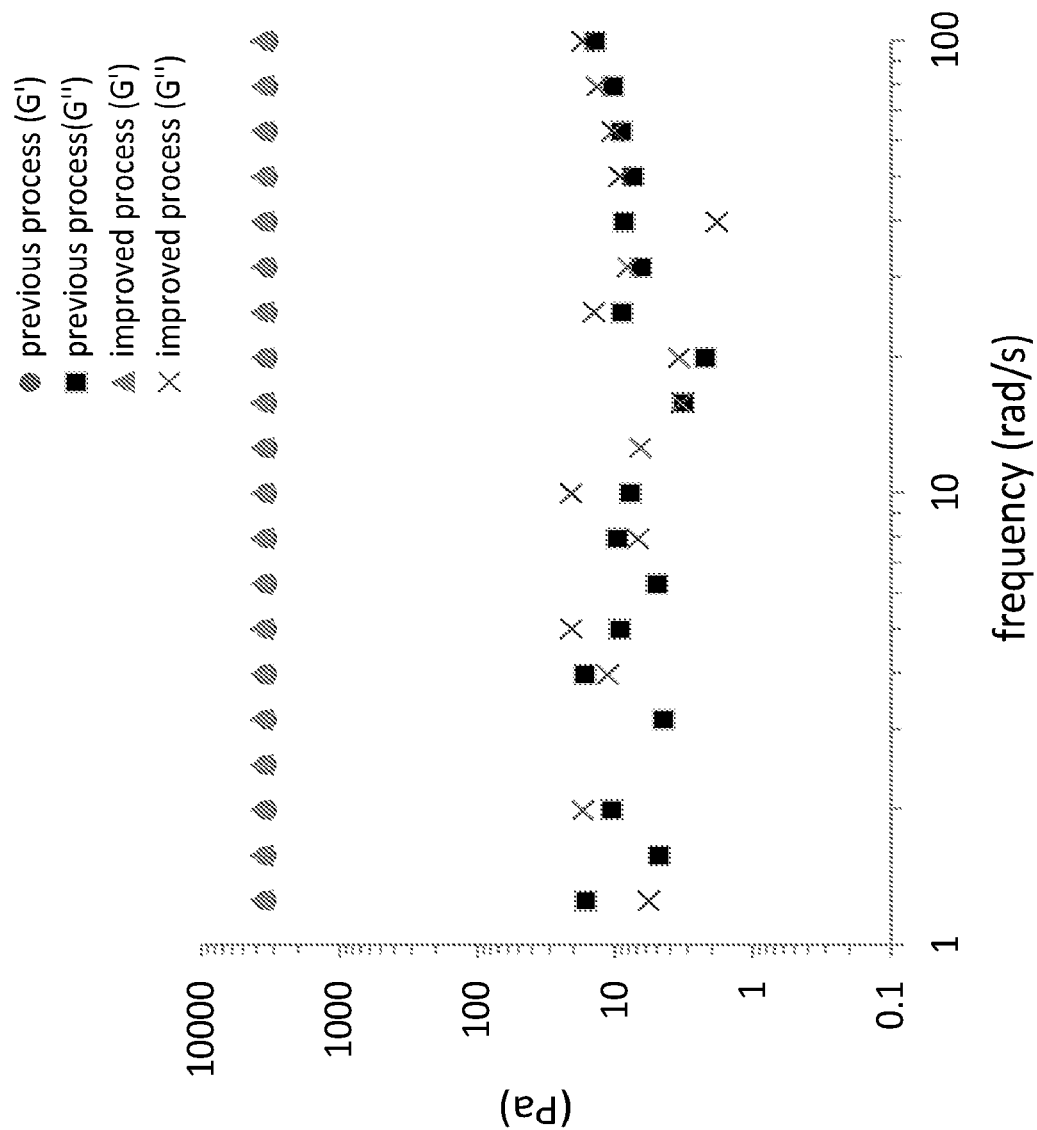
FIG. 5 depicts the viscoelastic properties as a factor of frequency of hydrogels originating from both organic solvent free procedure and the previously disclosed procedure involving acetone precipitation and ethanol addition.
Figure 6:
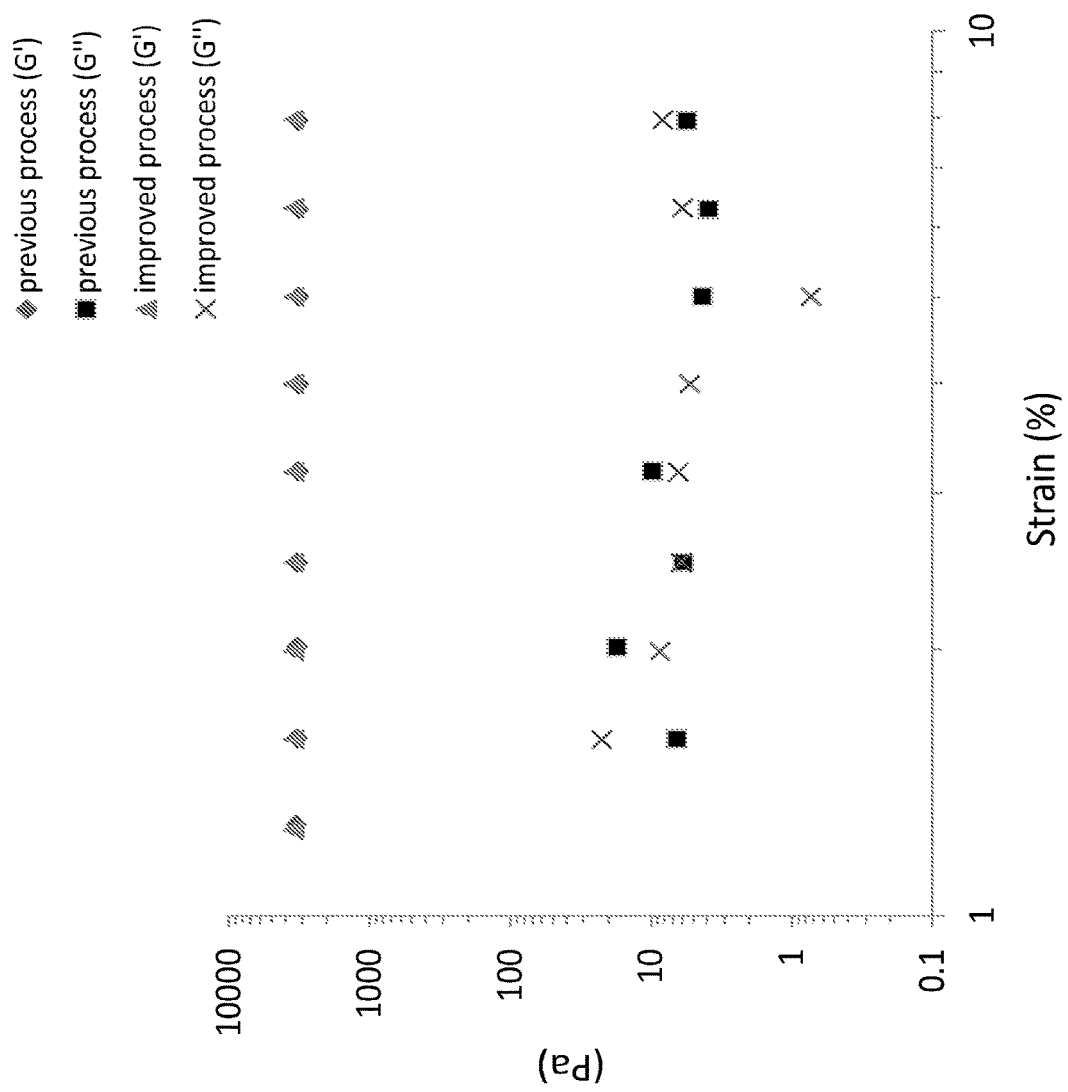
FIG. 6 depicts the viscoelastic properties as a factor of strain of hydrogels originating from both organic solvent free procedure and the previously disclosed procedure involving acetone precipitation and ethanol addition.

| | G' max [Pa] | |
|---|---|---|
| test # | Previous process | Improved process |
| 1 | 3689 | 3944 |
| 2 | 3660 | 3925 |
| 3 | 3936 | 3906 |
| Average | 3761.7 | 3925.0 |
| STDEV | 151.7 | 19.0 |
| ttest | 0.20 | | c) measurements of the viscoelastic properties were performed for hydrogels obtained from both improved process and previously disclosed process. Rheological measurements of shear storage modulus (G') and shear loss modulus (G") as function of frequency (FIG. 5) and strain (FIG. 6) demonstrated that the improved process which avoids the use of organic solvents give rise to similar viscoelastic properties as the previously disclosed hydrogel composition, and thus provides the desired viscoelastic properties while having an increased biocompatibility and an improved preparation process.

d) Young's modulus (E) measurements for hydrogels obtain from both improved process and previously disclosed process. Compression test analysis of cylindrical samples of both hydrogels samples demonstrated to be statistically indifferent in terms of their elasticity properties as demonstrated in Table 7. The results support the finding that the improved process which avoids the use of organic solvents, more specifically, acetone and ethanol, for the preparation of the hydrogel maintains the beneficial mechanical properties without jeopardizing the obtained elasticity of the hydrogel product.

TABLE 7

| Sample | Sample | Young's modulus in compression (E) [Pa] | Average [Pa] | STDEV [Pa] | ttest |
|---|---|---|---|---|---|
| Improved process (organic solvent free) | 1 | 18,598 | 19,848 | 1,092 | 0.61 |
| | 2 | 20,327 | | | |
| | 3 | 20,619 | | | |
| Previous process (contains acetone and ethanol residue) | 1 | 19,328 | 20,346 | 1,088 | |
| | 2 | 20,217 | | | |
| | 3 | 21,493 | | | |

The foregoing examples of specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

The invention claimed is:

1. A ready for use kit comprising:
    a stable ready for use liquid formulation in a non-crosslinked form, comprising a mixture of a protein-polymer conjugate composition and at least one polymerization initiator agent,
    wherein the protein-polymer conjugate composition comprises an extracellular matrix (ECM) protein covalently bound to a synthetic polymer, wherein the synthetic polymer contains at least one polymerizable group; and
    a sealed container selected from the group consisting of a single vial aliquot and a pre-filled syringe; wherein the liquid formulation comprising the mixture is stored within the sealed container in the kit under ultraviolet-visible (UV-vis) light protected conditions in a pre-gelated form so that the liquid formulation inside the container does not form a hydrogel by polymerization or crosslinking.

2. The ready for use kit according to claim 1, wherein the at least one polymerization initiator agent is selected from the group consisting of bis(2,4,6-trimethylbenzoyl)phenylphosphine oxide (BAPO), 2,2-dimethoxy-s-phenylacetophenone (DMPA), camphorquinone (CQ), 1-phenyl,-1,2-propanedione (PPD), Cp'Pt (CH3)3 (Cp=eta5-C5H4CH3), 2-hydroxy-1-[4-hydroxyethoxy)phenyl]-2-methy;-1-propanone, dimethylaminoethyl methacrylate (DMAEMA), 2-2-dimethoxy-2-phenylacetophenone, benzophenone (BP), flavin containing compounds, and a combination of triethanolamine, N-vinylpyrrolidone and eosin-Y.

3. The ready for use kit according to claim 1, wherein the container is a single vial aliquot.

4. The ready for use kit according to claim 1, wherein the composition comprises less than 10 ppm of acetone.

5. The ready for use kit according to claim 1, wherein the composition comprises less than 100 ppm ethanol.

6. The ready for use kit according to claim 1, further comprising the same synthetic polymer in unconjugated form.

7. The ready for use kit according to claim 6, wherein the same synthetic polymer in unconjugated form is crosslinkable with the protein-polymer conjugate upon exposure to light to form a hydrogel, or wherein the same synthetic polymer in unconjugated form is polymerizable upon exposure to UV-vis light.

8. The ready for use kit according to claim 1, wherein the extracellular matrix protein comprises fibrinogen of a bovine source or a porcine source.

9. The ready for use kit according to claim 1, wherein the extracellular matrix protein comprises purified or partially purified fibrinogen of human source.

10. The ready for use kit, according to claim 1, wherein the synthetic polymer is selected from the group consisting of polyethylene glycol (PEG), hydroxyapatite/polycaprolactone (HA/PLC), polyglycolic acid (PGA), poly-L-lactic acid (PLLA), polymethyl-methacrylate (PMMA), polyhydroxyalkanoate (PHA), poly-4-hydroxybutryate (P4HB), polypropylene fumarate (PFF), polyethylene glycol-dimethacrylate (PEG-DMA), polyethylene glycol-diacrylate (PEG-DA), beta-tricalcium phosphate (beta-TCP) and nonbiodegradable polytetrafluoroethylene (PTFE).

11. The ready for use kit, according to claim 1, wherein the synthetic polymer is polyethylene glycol-diacrylate (PEG-DA).

12. The ready for use kit, according to claim 1, wherein the extra cellular matrix protein comprises human fibrinogen sealant.

13. The ready for use kit according to claim 1, wherein the molar ratio of synthetic polymer to protein is between 100:1 to 250:1.

14. The ready for use kit according to claim 1, wherein the molar ratio of synthetic polymer to protein is between 100:1 to 150:1.

15. The ready for use kit according to claim 1, wherein the liquid formulation is substantially free of a polar organic solvent.

16. The ready for use kit according to claim 1, wherein the conjugate is produced by a process comprising performing a reaction between an ECM protein, and the polymer to form the conjugate; and then concentrating the conjugate without precipitating the conjugate with a polar organic solvent.

17. The ready for use kit, according to claim 16, wherein the process for producing the conjugate comprises the steps of:
    (a) providing a solution comprising at least one denatured extracellular matrix protein;
    (b) providing a solution comprising a synthetic polymer having polymerizable groups;
    (c) mixing the extracellular matrix protein solution of (a) with the solution comprising the synthetic polymer of (b) to create a crude reaction mixture comprising covalent conjugates between sulfhydryls of the protein and the polymerizable groups; and (d) concentrating the crude reaction mixture of step (c) without a concentrating process utilizing a polar organic solvent.

18. The ready for use kit, according to claim 1, wherein the container is a pre-filled syringe.

19. A ready for use kit comprising:

a stable ready for use liquid formulation in a non-cross-linked form, comprising a mixture of a protein-polymer conjugate composition and at least one polymerization initiator agent, a sealed container selected from the group consisting of a single vial aliquot and a pre-filled syringe; wherein the liquid formulation comprising the mixture is stored within the sealed container in the kit under UV-vis light protected conditions in a pre-gelated form so that the liquid formulation inside the container does not form a hydrogel by polymerization or crosslinking, wherein the liquid formulation comprising the mixture includes defined molar ratios of protein to polymer to form a hydrogel upon exposure to UV-vis light, wherein the hydrogel has a shear storage modulus in the range of 0.05 kPa to 35 kPa and wherein the molar ratios provide the hydrogel with controlled rates of disintegration when administered in vivo within a subject.

* * * * *